United States Patent
Ludtke, II

(10) Patent No.: US 10,101,173 B2
(45) Date of Patent: Oct. 16, 2018

(54) SYSTEM AND METHOD FOR DYNAMICALLY DETERMINING AND INDICATING AN AIRCRAFT BANK LIMIT ON AN AIRCRAFT INSTRUMENT PANEL

(71) Applicant: THE BOEING COMPANY, Chicago, IL (US)

(72) Inventor: Frederick E. Ludtke, II, Freeland, WA (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 15/212,015

(22) Filed: Jul. 15, 2016

(65) Prior Publication Data
US 2018/0017410 A1   Jan. 18, 2018

(51) Int. Cl.
| | |
|---|---|
| *G05D 1/00* | (2006.01) |
| *G05D 1/08* | (2006.01) |
| *G05D 3/00* | (2006.01) |
| *G06F 7/00* | (2006.01) |
| *G06F 17/00* | (2006.01) |
| *G01C 23/00* | (2006.01) |
| *B64D 45/00* | (2006.01) |
| *G05D 1/04* | (2006.01) |
| *B64D 43/02* | (2006.01) |

(52) U.S. Cl.
CPC ........... *G01C 23/005* (2013.01); *B64D 43/02* (2013.01); *B64D 45/00* (2013.01); *G05D 1/044* (2013.01)

(58) Field of Classification Search
CPC ......... B64D 43/02; B64D 45/00; G05D 1/044
USPC .................................................... 701/4
See application file for complete search history.

(56) References Cited

U.S. PATENT DOCUMENTS

| | | |
|---|---|---|
| 6,489,898 B1 | 12/2002 | Nicholls |
| 2011/0205090 A1 | 8/2011 | Marstall et al. |
| 2012/0303186 A1 | 11/2012 | Puig et al. |
| 2014/0156116 A1 | 6/2014 | Nelson |
| 2014/0218216 A1 | 8/2014 | Conner et al. |

OTHER PUBLICATIONS

Jaime Beneyto, MSC Aeronautical Engineer (PPL(A); An Analysis of the Boeing 777 Fly-By-Wire System; Apr. 6, 2016; URL: https://www.linkedin.com/pulse/ analysis-boeing-777-fly-by-wire-system-jaime-beneyto-gómez-de-barreda.
Wikipedia—Anonymous; V-speeds; Jul. 12, 2016; URL: https://en.wikipedia.org/w/index.php?title=V_speeds&oldid=729533252.
European Patent Office Extended European Search Report, Application No. 17170705.2-1557, dated Nov. 27, 2017.

*Primary Examiner* — Maceeh Anwari
(74) *Attorney, Agent, or Firm* — Apogee Law Group P.C.; Francisco A. Rubio-Campos

(57) ABSTRACT

Systems and methods are provided for indicating a bank limit on an instrument display of an aircraft. In an example implementation, static air pressure measurements, impact air pressure measurements, an acceleration measurement, and an angle of attack may be received from corresponding sensors. A current airspeed and a stick shaker speed are determined. A minimum maneuver speed is determined from the current airspeed and the shaker stick speed. A bank limit indicator is provided on the flight display when the current airspeed is equal to or less than the minimum maneuver speed. A bank angle limit is displayed on the bank limit indicator based on the extent to which the current airspeed is equal to or less than the minimum maneuver speed.

20 Claims, 9 Drawing Sheets

SYSTEM AND METHOD FOR DYNAMICALLY DETERMINING AND INDICATING AN AIRCRAFT BANK LIMIT ON AN AIRCRAFT INSTRUMENT PANEL

BACKGROUND

1. Field

The present disclosure relates generally to aircraft instrument panels, and more particularly, to systems and methods for indicating an aircraft bank limit on an aircraft instrument panel.

2. Related Art

Typical large commercial aircraft operate using defined limits on various parameters to assist the pilot in avoiding unsafe flying conditions, such as a stall. One example of such limits is the stick shaker speed, which is the speed at which the pilot is warned of an imminent stall. The term "stick shaker" indicates the typical method of alerting the pilot, which is performed by a mechanical device that causes the yoke to vibrate when the aircraft approaches the speed determined to place the aircraft in an imminent stall.

A minimum maneuver speed may be defined as the minimum airspeed that still provides full maneuvering capability. The industry standard for the maximum bank angle considered necessary for the normal maneuvering of large commercial transport aircraft is 40 degrees of bank. The load required to maintain level flight at the maximum normal bank angle of 40 degrees is 1.3 times gravity (1.3 G). The minimum maneuver speed then is the slowest speed that will provide a level 40 degrees of bank turn without setting the stick shaker. Any speed below this value will not allow a level 40-degree bank turn without setting the stick shaker; therefore, the airplane is maneuver limited in bank angle, which correlates to both a specific turn radius, and a specific G load. When operating at speeds below the minimum maneuver speed, pilots must, when maneuvering the airplane, limit bank angles (and therefore G-load) to angles something less than 40 degrees of bank.

In an example flight display (known generally as the Primary Flight Display, or "PFD"), the aircraft's current airspeed is indicated on a PFD speed tape, or a band of speed values, running (typically) vertically on a portion of the display. The minimum maneuver speed is marked on the speed tape. In example implementations, the minimum maneuver speed may be marked at a high end of a highlighted band of speeds that extends lower in speed values to the stick shaker speed. In one example implementation, the highlighted band is highlighted with a color, such as amber, and may be referred to as the Amber Band. The lower speed end of the highlighted band is at the stick shaker speed, which may be an end of another highlighted band of speeds. In an example implementation, the lower end of the first highlighted band (hereafter referred to as the "amber band" for purposes of description) is the top of a red and black band that may be referred to as the "Barber Pole." The top of the barber pole is the stick shaker speed.

Pilots may safely fly in the amber band, provided they understand the physical limitations placed on the aircraft. High bank turns can require enough pitch angle (and G force) to maintain level flight to encounter the stick shaker condition. In some aircraft, the PFD displays a Pitch Limit Indicator (PLI) that provides a visual indication of the pitch margin to stick shaker. While flying in the amber band, the pilot rolls the aircraft into bank angles without knowledge of any bank angle limit. The pilot substantially adjusts the bank of the plane and tries to avoid the stick shaker by feel.

In view of the above, there is a need in the art for a way of providing bank limit information to the pilot when the speed of the aircraft falls below the minimum maneuver speed.

SUMMARY

Systems and methods are provided for indicating a bank limit on an instrument display in an aircraft. In an example of a method for indicating a bank limit on an instrument display, a static air pressure measurement is received from a static air pressure sensor. An impact air pressure measurement is received from a pitot air pressure sensor. An acceleration measurement is received from an accelerometer. An angle of attack measurement is received from an angle of attack sensor. A current airspeed is determined based on the impact air pressure measurement and the static air pressure measurement. A stick shaker speed is determined based on the current airspeed. A minimum maneuver speed is determined based on the current airspeed, the acceleration measurement and the stick shaker speed. A bank limit indicator is displayed on a flight display when the current airspeed is equal to or less than the minimum maneuver speed. A bank angle limit is displayed on the bank limit indicator based on an extent to which the current airspeed is equal to or less than the minimum maneuver speed.

Other devices, apparatus, systems, methods, features and advantages of the subject matter described herein will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

This disclosure may be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

Figure 1A:
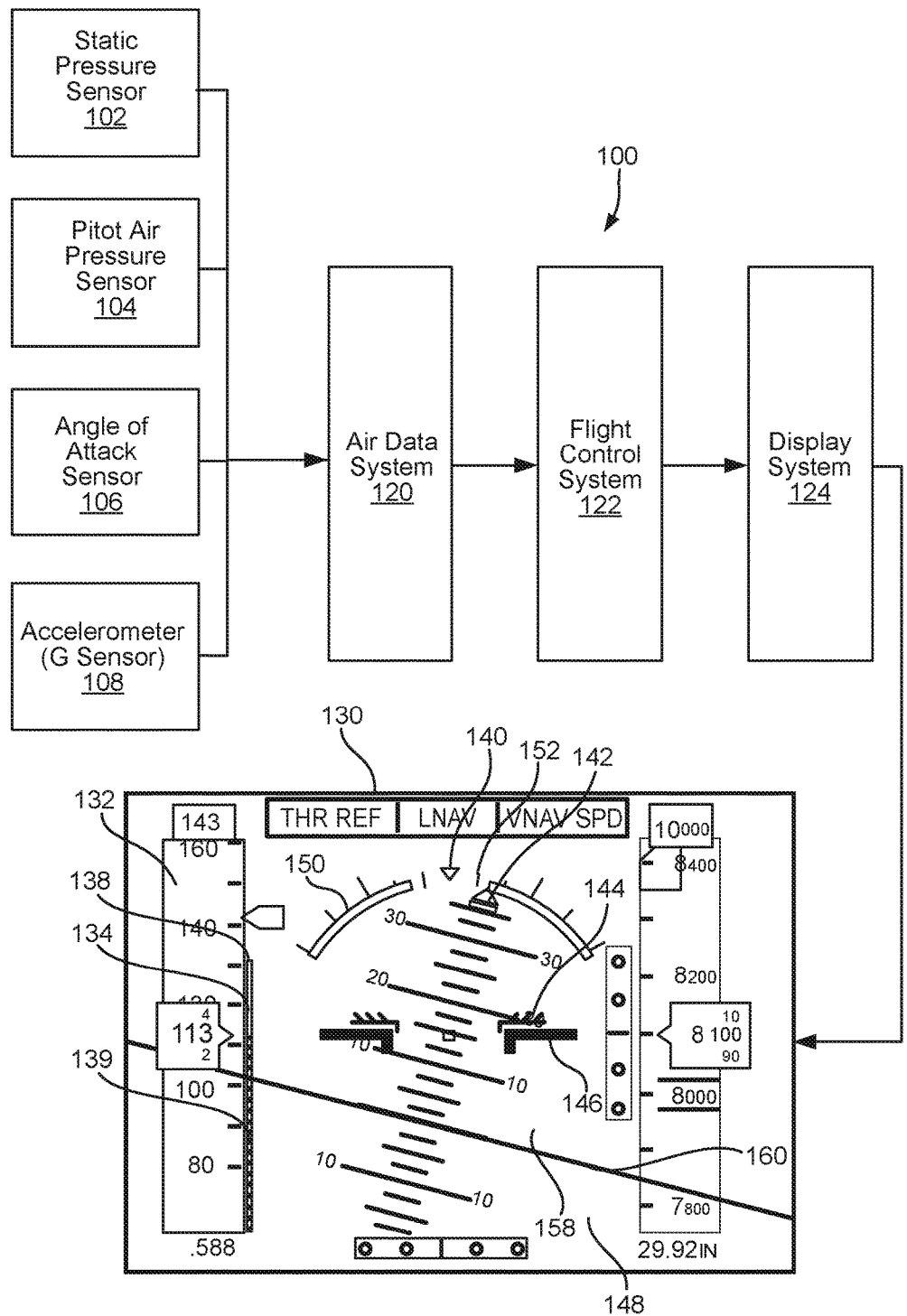
FIG. 1A is a block diagram of an example aircraft control system configured to provide a bank limit indicator on the flight display.

FIG. 1A is a block diagram of an example aircraft control system 100 configured to provide a bank limit indicator 150 on an aircraft flight display 130. The aircraft control system 100 controls an aircraft and provides information on the aircraft flight display 130 based on data received from various sensors. The aircraft control system 100 includes an air data system 120 comprising input connections to a static air pressure sensor 102 to receive a static air pressure measurement, a pitot air pressure sensor 104 to receive an impact air pressure measurement, an angle of attack sensor 106 to receive an angle of attack measurement, and an accelerometer 108 to receive an acceleration measurement. Data from the air data system 120 is communicated to a flight control system 122, which processes data, such as the measurements from the static air pressure sensor 102, the Pitot air pressure sensor 104, the angle of attack sensor 106, and the accelerometer 108, received from the air data system 120. The flight control system 122 communicates selected parameters and flight data to a flight display system 124. The flight display system 124 receives the flight data from the flight control system 122 and displays the selected data relating to the flight of the aircraft.

In general, the static air pressure sensor 102, the pitot air pressure sensor 104, the angle of attack sensor 106 and accelerometer 108 may each be implemented using conventional sensors that are well known in the art. The static air pressure sensor 102 includes one or more static ports flush mounted on the fuselage or other suitable surface to receive airflow. The static air pressure measurement is used in calculating the aircraft airspeed and in determining vertical airspeed and altitude.

The pitot air pressure sensor 104 includes one or more pitot ports mounted on the wing(s) or other surface that allows the pitot port to receive air flowing directly into the pitot tube. The pitot air pressure sensor 104 measures impact air pressure (or, ram air pressure), due to the motion of the aircraft. The difference between the impact air pressure and the static air pressure is the dynamic air pressure. The aircraft airspeed is determined from the dynamic air pressure.

The angle of attack sensor 106 uses flap-like component extending from the fuselage, or mounted on a wing, so as to swing up or down as the aircraft moves forward. The motion of the flap-like component of the angle of attack sensor 106 is caused by the air flow due to the motion of the aircraft. The linear trajectory of the flap-like component as the air flow moves it up or down provides the direction of flight of the aircraft, which is also the vector of the velocity of the aircraft. The angle formed by the vector of velocity and the reference line of the body of the aircraft is the angle of attack of the aircraft. The angle of attack is used to determine the aircraft's pitch and in determining the coefficient of lift at any given time.

The accelerometer 108 determines the G-force of the aircraft. The accelerometer 108 may be implemented using a damped mass on a spring in a casing. When the mass is subject to an acceleration, the mass is displaced to the point that the spring is able to accelerate the mass at the same rate as the casing. A piezoelectric, piezoresistive, or capacitive sensor may be used to sense the displacement and generate an electrical signal in response. The accelerometer 108, along with the static air pressure sensor 102 and the pitot air pressure sensor 104, as part of the air data system 120, may be components of an inertial navigation system that allows for a continuous calculation, via dead reckoning, of the position, orientation, and velocity (direction and speed of movement) of a moving object without the need for external references.

FIG. 1 shows single instances of each of the static pressure sensor 102, the pitot air pressure sensor 104, the angle of attack sensor 106, and the accelerometer 108. In example implementations, each sensor may be replaced by multiple instances of each sensor. For example, multiple angle of attack sensors 106 may be placed on different positions of the aircraft. For implementations in which multiple sensors are used, a voting procedure may be used to select the best sensor output value from among the multiple sensors.

The air data system 120 may be implemented as a hardware interface for the sensor devices connected to the air data system 120 as inputs. The air data system 120 may include some software functions for performing some data conversion, data storage, or other preliminary functions. The air data system 120 may also include interfaces (which may include output connections to other devices) for other functions that may or may not be related to the flight data to be displayed on the flight display system 124. The static air pressure sensor 102, the pitot air pressure sensor 104, the angle of attack sensor 106, and the accelerometer 108 may be components of an inertial navigation system, which may also be implemented as the air data system 120 in the example shown in FIG. 1A.

Figure 1B:
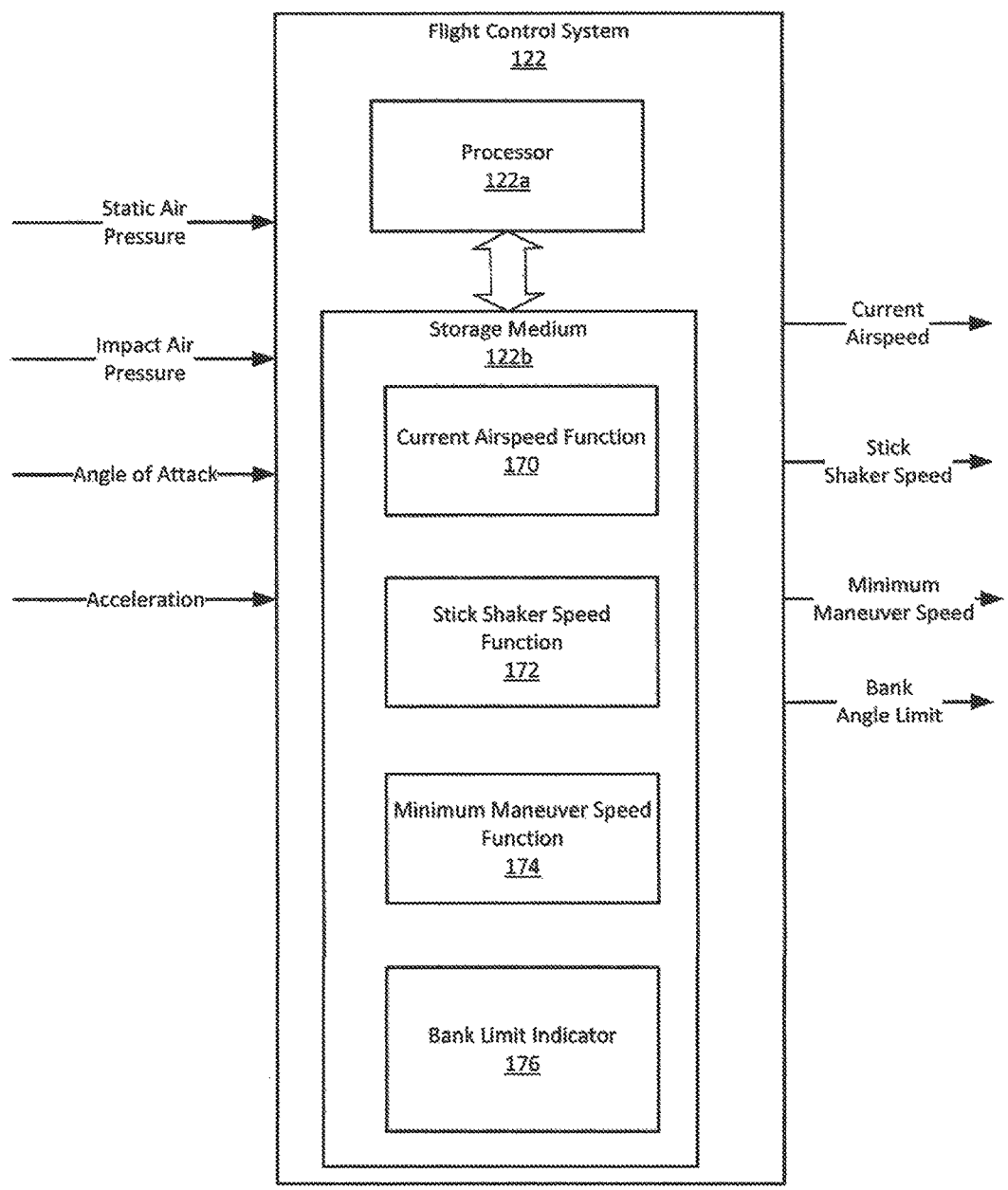
FIG. 1B is a block diagram of an example flight control system that may be used in the aircraft control system in FIG. 1A.

The flight control system 122 receives data from the air data system 120 and uses the data to provide information about the flight and the aircraft to the pilot by communicating the information to the flight display system 124. FIG. 1B is a block diagram of an example flight control system 122 that may be used in the aircraft control system in FIG. 1A. The flight control system 122 includes, or connects to a data bus with access to a processor 122a and a non-transitory storage medium 122b, which stores machine-executable instructions that perform air flight control functions. In an example implementation of the flight control system 122, the functions performed by the machine-executable instructions include a current airspeed function 170, a stick shaker speed function 172, a minimum maneuver speed function 174, and a bank limit indicator function 176. Each of the functions of the flight control system 122 may be implemented as computer programs with access to data based on measurements from the sensors via the air data system 120.

The current airspeed function 170 determines a current airspeed based on the impact air pressure measurement and the static air pressure measurement, which are shown as inputs to the flight control system 122 in FIG. 1B. The current airspeed is calculated from the dynamic pressure, which is the difference between the impact air pressure and the static air pressure. The current airspeed function 170 may calculate a calibrated current airspeed, which is the airspeed corrected for instrument errors, position error (due to incorrect pressure at the static port) and installation errors. The determination of the current airspeed and calibrated current airspeed is well-known in the art.

The stick shaker speed function 172 determines a stick shaker speed based on the current airspeed, the impact air pressure measurement and the static air pressure measurement. The stick shaker speed is the speed at which the pilot is warned of an imminent stall and may be calculated in an example implementation using the following equation:

$$V_{SS} = V_{CAS} * \sqrt{\frac{C_L + (K_{SB} * C_{LSB}) + C_{LFC}}{C_{LSSP} + (K_{SB} * C_{LSSPSB})}} \quad \text{EQN (1)}$$

Where:
$V_{CAS}$=Calibrated Current Airspeed.
$C_L$=Coefficient of lift calculated from clean wing only or from a non-clean wing flap/slat table based on current Mach speed and/or corrected angle of attack.
$K_{SB}$=Speed brake lever Compensation Factor.
$C_{LSB}$=Coefficient of lift correction for speed brake calculated from clean wing only or from a non-clean wing flap/slat table based on current Mach speed and/or corrected angle of attack.
$C_{LFC}$=Coefficient of lift correction for Landing Attitude Modifier (LAM) and/or Autodrag provided by flight controls to account for the lift loss commanded by the LAM function and Autodrag function.
$C_{LSS}$=Coefficient of lift at stick shaker calculated from clean wing only or from a non-clean wing flap/slat table
$C_{LSSSB}$=Coefficient of lift correction for speedbrake calculated from clean wing only or from a non-clean wing flap/slat table based on current Mach and/or αSTRIP.

It is noted that the coefficient of lift is a well-known parameter used in determining aircraft flight information. It is also well known for aircraft to employ flight control surfaces such as, a speedbrake, slats, and flaps used to control the aircraft. Determining the coefficient of lift for various states of the speedbrake and other flight control surfaces is also well known in the art. In order to avoid certain arithmetic anomalies, the following limits are defined for EQN (1):

For $V_{SS}$: If $(C_L+(K_{SB}*C_{LSB})+C_{LFC})<0$, then $(C_L+(K_{SB}*C_{LSB})+C_{LFC})=0$, and If $C_{LSSP}(K_{SB}*C_{LSSPSB})\leq 0$, then $C_{LSSP}+(K_{SB}*C_{LSSPSB})=0.001$. \quad EQN (2)

EQNs (1) and (2) above are provided as an example method for determining a stick shaker speed $V_{SS}$. As noted above, the stick shaker speed is defined as being the speed at which the pilot is warned of an imminent stall. Typically, when the aircraft is at the stick shaker speed, the aircraft control system causes the yoke to shake or vibrate to alert the pilot of the danger of an imminent stall. The stick shaker speed is also used to determine the minimum maneuver speed.

The minimum maneuver speed function 174 determines a minimum maneuver speed based on the current airspeed, the shaker stick speed, the weight of the aircraft, and various other factors depending on the aircraft. The minimum maneuver speed may be defined as the speed at which an aircraft's maneuvering capability is limited to reduce the possibility of the aircraft stalling. An aircraft's bank angle and angle of attack, in particular, may be limited at or below the minimum maneuvering speed. Airspeeds exceeding the minimum maneuver speed provides no limitation on angle of attack or of bank angle. Typically, an upper limit maneuvering speed is defined as the speed beyond which certain maneuvers are similarly limited to avoid excessive mechanical stress on the aircraft structure.

A precise definition of the minimum maneuver speed depends on the design characteristics of the aircraft. Some aircraft may have a higher tolerance for bank angle or pitch angle, for example, at speeds approaching the stick shaker speed. In an example implementation, the minimum maneuver speed is defined as the minimum airspeed that provides full maneuvering capability of 40 degrees of bank (and 1.3 G) without tripping the stick shaker.

The determination of the airspeeds, the stick shaker speed, and minimum maneuver speed is performed in a noisy environment, which may lead to invalid data. In some example implementations, calculations of aircraft airspeed, such as the stick shaker speed, or the minimum maneuver speed may be performed using a digital filter, such as for example, a Tustin bi-linear digital filter. Such digital filters are well-known to those of ordinary skill in the art.

The minimum maneuver speed may be determined using the following:

$$V_{MMS} = V_{SS} * \left[\frac{1.140}{\sqrt{n}}\right] * \left[\frac{1}{(5S+1)}\right], \quad \text{EQN (3)}$$

where $V_{SS}$=Stick Shaker Speed, unfiltered.
S=a Laplacian Operator for the Bi-linear transform digital filter.

$$n = \text{Load Factor} = 1 + (AL_{FIL} * \sin\alpha) + (AN_{FIL} * \cos\alpha); \quad \text{EQN (4)}$$
$\alpha$ = Angle of Attack, which may be voted value.

$$AL_{FIL} = AL * \left[\frac{1}{(0.5S+1)}\right]; \quad \text{EQN (5)}$$

$AL$ = Body Longitudinal Acceleration from flight controls, $$AN_{FIL} = AN * \left[\frac{1}{(0.5S+1)}\right]; \quad \text{EQN (6)}$$

AN=Body Normal Acceleration from flight controls.
n Limits: $0.5 \leq n \leq 1.5$;
$V_{MMS}$ Limits: $0 \, V_{MMS} \leq 512$ knots;
$V_{MMS}$ Limit is determined by:

if $V_{MMS}$ Limit is True, then SET
$V_{MMS}=FMF_{VREFSPD}$, else SET $V_{MMS}=V_{MMS}\{f\}$.

If $BA \geq 20,200$ AND $SBLP<10$ AND Clean Wing is TRUE, then $V_{MMS}=V_{MMS}-0$, \quad EQN (6)

Where:
BA=Barometric Altitude,
SBLP is PFC SPDBK LEVER POSN
 (Primary Flight Controls Speed Brake Lever Position),
Clean Wing is TRUE if the Slats Retracted" is TRUE and
 "Flaps Posn Detent Up" is TRUE.

EQNs (3)-(6) are used to determine the minimum maneuver speed in an example implementation for an example aircraft. It is to be understood by those of ordinary skill in the art that the minimum maneuver speed may be determined using other equations or relationships based on the physical specifications of the aircraft. Other implementations may or may not use the Tustin bi-linear digital filter, or may use other types of filters. A variety of methods may be used to determine a minimum maneuver speed for a given aircraft.

The bank limit indicator function 176 is configured to determine a bank angle limit for display on a bank limit indicator on the flight display when the current airspeed is equal to or less than the minimum maneuver speed. The bank limit indicator function 176 displays the bank angle limit on the bank limit indicator based on the extent to which the current airspeed is equal to or less than the minimum maneuver speed.

It is noted that the bank limit indicator function 176 may be implemented as one or more software functions implemented as sets of machine-executable instructions stored in the non-transitory storage medium 122b. Functionality may be added as described below to add features to the information displayed to the pilot. Such functionality may be added as additional software functions implemented as additional machine-executable instructions. The machine-executable instructions may be configured to execute the functions for the bank limit indicator function 176 and other feature functions according to any of the logic described below or in the drawings.

In an example implementation, the bank limit indicator function 176 may be further configured to set the bank angle limit on the bank limit indicator to a maximum bank angle limit when the current airspeed is equal to the minimum maneuver speed and to a minimum bank angle limit when the current airspeed is equal to the stick shaker speed. The bank limit indicator function 176 may also set the bank angle limit to a bank angle between the maximum bank angle limit and the minimum bank angle limit when the current airspeed is between the minimum maneuver speed and the stick shaker speed. The maximum bank angle limit is the industry-accepted value of 40-degree banks for normal flight. Because a 40 degree bank requires 1.3 G to remain in level flight, the slowest airspeed at which 40 degree bank and 1.3 G load will not set the stick shaker is the minimum maneuver speed. At speeds below the minimum maneuvering speed, the bank angle limit becomes the maximum bank angle (and correlated G load) the airplane can fly without tripping the stick shaker. This limit will vary from 40 degrees to as low as 15 degrees.

The bank angle limit for airspeed values between the minimum maneuver speed and the stick shaker speed may be determined by establishing a relationship between the range of bank angles between the maximum bank angle and the minimum bank angle and the range of airspeeds between the minimum maneuver speed and the stick shaker speed. In one example implementation, the bank limit indicator function 176 may select a bank angle value between the maximum bank angle limit and the minimum bank angle limit corresponding to the current airspeed where bank angle values between the maximum bank angle limit and the minimum bank angle limit correspond linearly with airspeed values between the minimum maneuver speed and the stick shaker speed. That is, the bank limit indicator function 176 may define a scale that relates the range of bank angles and the range of airspeeds.

Referring back to FIG. 1A, the flight display system 124 receives data to be displayed to the pilot, then configures and arranges the data on the flight display 130. The flight display 130 in FIG. 1A illustrates one example of how data and information may be provided to the pilot on the flight display. One category of information displayed to the pilot relates to the aircraft's flight speed. The flight display system 124 may display the current airspeed, for example, by positioning a pointing graphic element 131 on the flight display 130 to point to the current airspeed on a band 132 of airspeeds displayed on the flight display 130. The band 132 of airspeeds is shown in FIG. 1A as a vertical band disposed on one side of the flight display 130.

The bank limit indicator function 176 may also provide the flight display system 124 with data to indicate a stick shaker speed 137 using a highlighting graphical element 139 on the band 132 of airspeeds displayed on the flight display 130. In the example shown in FIG. 1A, the highlighting graphical element 139 is a striped vertical bar extending from the stick shaker speed 137 at the top of the bar to a lower limit of airspeeds at the bottom of the bar. In a further example implementation, the highlighting graphical element 139 may be provided in colors indicative of an alarm or critical condition. For example, some flight displays may show the highlighting graphical element 139 as a red and black striped pole.

The bank limit indicator function 176 may also provide the flight display system 124 with data to indicate a minimum maneuver speed 138 using a second highlighting graphical element 134 on the band 132 of airspeeds displayed on the flight display 130. In the example shown in FIG. 1A, the second highlighting graphical element 134 is displayed as a vertical band extending from the minimum maneuver speed 138 at the top of the band to the stick shaker speed 137 at the bottom of the band. In an example implementation, the second highlighting graphical element 134 may be displayed in a color indicative of an alarm condition. In one example, the second highlighting graphical element 134 is displayed as an amber colored band.

The bank limit indicator function 176 may provide the flight display system 124 with data to indicate a bank limit indicator 150 corresponding to a range of bank angles. The bank limit indicator 150 is displayed as an arcuate band having a first region 151 indicating a range of safe bank angles between zero bank and the bank angle limit. The arcuate band of the bank limit indicator 150 may also include a second region divided into two unsafe bank angle sections 152a, 152b. The first unsafe bank angle section 152a indicates a range of unsafe bank angles for when the aircraft is in a left turn. The second unsafe bank angle section 152b indicates a range of unsafe bank angles for when the aircraft is in a right turn. The first region 151 indicating safe bank angles may be disposed between the first unsafe bank angle section 152a and the second bank angle section 152b.

The bank limit indicator function 176 may also provide the flight display system 124 with data to display a zero bank reference using a second pointing graphic element 140 fixed on the flight display 130 to point to the zero bank position on the arcuate band forming the bank limit indicator 150. It is noted that the bank limit indicator 150 showing the range of bank angles is referenced to the aircraft and as such remains at a fixed position substantially at the upper center of the display. As the aircraft enters a turn and begins to bank, the bank limit indicator 150 references to the flight display 130 so that it's orientation is fixed to the flight display 130. That is, in a bank, the flight display 130 angles with the bank angle of the aircraft. The bank limit indicator 150 too angles in the fixed position on the display.

The bank limit indicator function 176 may also provide the flight display system 124 with data to display a current bank angle pointer 142 using a third pointing graphic element. The current bank angle pointer 142 is referenced to the ground and points along the true vertical coordinate relative to the ground. The current bank angle pointer 142 therefore moves along an arcuate path to point to a current bank angle on the range of bank angles affixed to the display as the aircraft rolls.

The bank limit indicator function 176 may also provide the flight display system 124 with data to position the third pointing graphic element at an upper end of a pitch scale 143 indicating pitch angles. The flight display system 124 may further display a current pitch indicator 146 marking a current pitch angle of the aircraft on the pitch scale 143. As the pitch of the aircraft moves up or down, the current pitch indicator 146 moves along the pitch scale 143 to point to the current pitch angle value.

The bank limit indicator function 176 may also provide the flight display system 124 with data to determine a pitch limit angle based on a pitch margin to stick shaker. The determination of a pitch limit angle for when the aircraft current airspeed reaches the minimum maneuver speed or below is well-known. The flight display system 124 may display a pitch limit indicator 144 at a pitch limit angle on the pitch scale 143.

The flight display system 124 may provide a ground reference indicator 148, a sky indicator 158, and a horizon indicator 160 on the flight display 130 to provide the pilot with an indication of how the plane is oriented in relation to the ground.

It is noted that the graphical display illustrated in FIG. 1A is one example of how the above-described information may be presented to the pilot. The display may use different colors to provide further information to the pilot, and may position the information in different places and in different ways. For example, the band 132 is shown as a vertical band in FIG. 1A. In another example, the band 132 may be disposed horizontally. In addition, more information may be provided on the display, such as altitude information.

Figure 2:
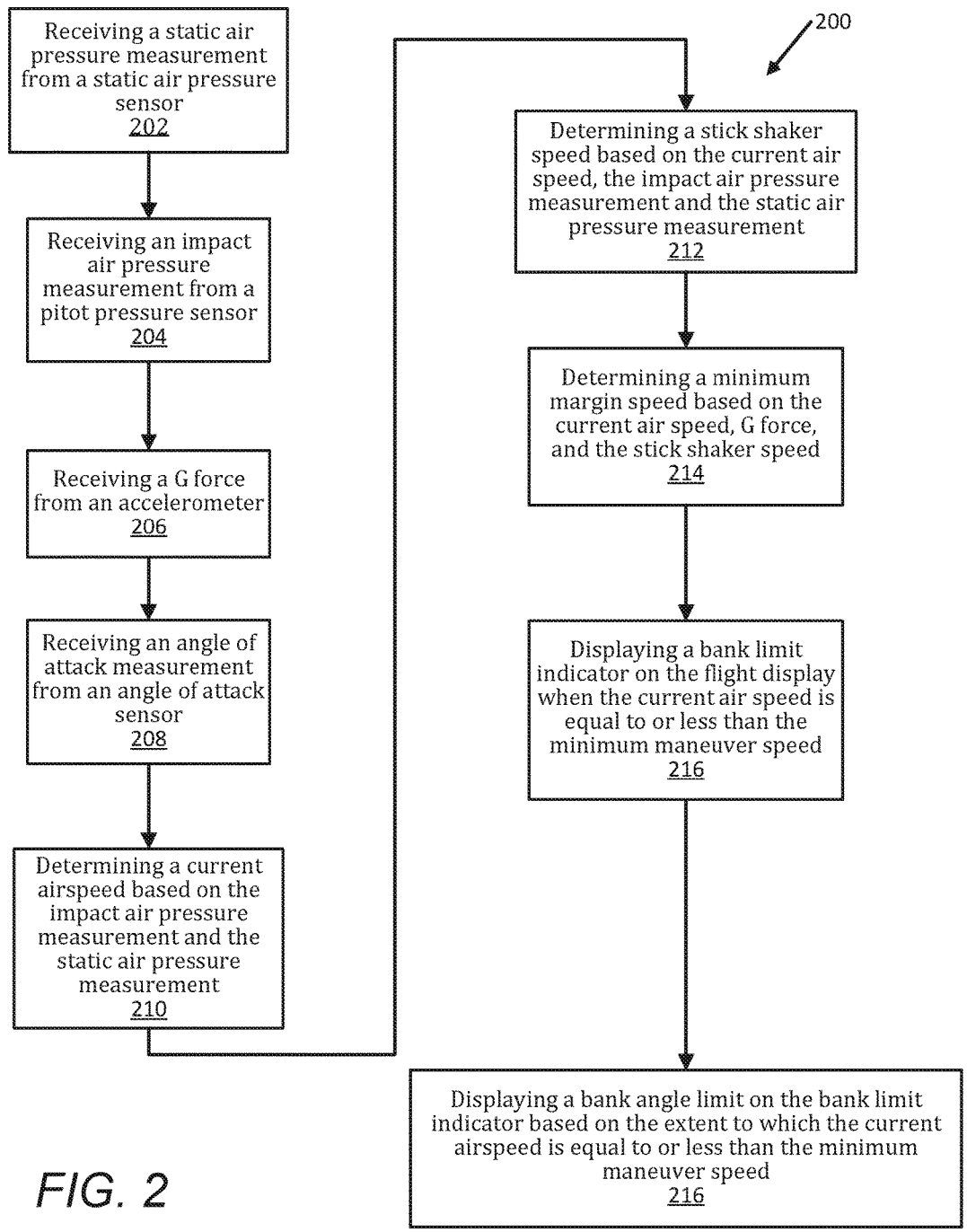
FIG. 2 is a flowchart illustrating operation of a method for determining a bank limit angle and displaying the bank limit indicator on the flight display.

FIG. 2 is a flowchart illustrating operation of a method 200 for determining a bank limit angle and displaying the bank limit indicator on the flight display. The method 200 in FIG. 2 may be performed in an aircraft control system such as the aircraft control system 100 described above with reference to FIGS. 1A and 1B. Unless stated otherwise, reference to components performing the steps in FIG. 2 shall correspond with the components described above with reference to FIGS. 1A and 1B.

In the method 200 in FIG. 2, at step 202, a static air pressure measurement may be received from the static air pressure sensor 102. At step 204, an impact air pressure measurement may be received from the pitot air pressure sensor 104. At step 206, a G-force may be received from the accelerometer, or G-force sensor, 108. At step 208, an angle of attack measurement is received from the angle of attack sensor 106. The current airspeed may be determined from the impact air pressure measurement and the static air pressure measurement at step 210. Step 210 may be performed as described above with reference to FIG. 1B. At step 212, a stick shaker speed may be determined from the current airspeed, impact air pressure measurement, and static air pressure measurement. Step 212 may be performed as described above with reference to FIG. 1B and EQNs (1) and (2). At step 214, the minimum maneuver speed may be determined based on current airspeed, shaker stick speed, and other parameters. Step 214 may be performed as described above with reference to FIG. 1B and EQNs (4), (5), and (6). At step 216, the flight display system 124 displays a bank limit indicator on the flight display when the current airspeed is equal to or less than the minimum maneuver speed. The bank limit indicator may be displayed as described above with reference to FIG. 1A, along with other information elements shown on the flight display 130 in FIG. 1A.

The bank limit indicator function provides the pilot with an indication of a limitation on the aircraft bank to guide the pilot in making turns when the aircraft is flying at the minimum maneuver speed or lower. This bank limit indication spares the pilot from having to rely on the feel of the aircraft to stay within safe bank angles. FIGS. 3-8 illustrate how the bank limit indicator function changes on a flight display 300 as the aircraft airspeed increases from a stick shaker speed to an airspeed higher than the minimum maneuver speed.

The flight display 300 depicted in FIGS. 3-8 includes a bank limit indicator 302 having a first unsafe bank angle section 304a and a second unsafe bank angle section 304b disposed on opposite sides of a safe bank angle section 306. A zero bank angle reference 303 may be fixed to point to the zero bank angle value. A current bank angle pointer 308 may be positioned to point to the current bank angle of the aircraft and move along the bank angle to continue to point to the current bank angle as the aircraft banks. The flight display 300 also includes a band of airspeeds 310 and a current airspeed indicator 324, which points to the current airspeed value on the band of airspeeds 310. A maneuver margin region 312 is provided on the band of airspeeds 310 to indicate a range of airspeeds extending from a minimum maneuver speed 314 at the top of the maneuver margin region 312 down to a stick shaker speed 322 at the bottom of the maneuver margin region 312. A second range of airspeeds below stick shaker 316 is provided from the stick shaker speed extending down to the lower limits of airspeeds on the band of airspeeds 310. The maneuver margin region 312 and the second range of airspeeds below stick shaker 316 may be indicated in distinct patterns and/or colors to more fully inform the pilot of the aircraft flight information. In an example implementation, the second range of airspeeds below stick shaker 316 may be displayed as a red and black striped vertical bar similar to a barber pole. The flight display 300 in FIGS. 3-8 further includes a current pitch indicator 318 and a pitch limit indicator 320. The current pitch indicator 318 moves along a pitch scale 326 to point to the current aircraft pitch on the pitch scale 326 as the aircraft angle of attack changes. The pitch limit indicator 320 indicates the highest safe pitch at which the aircraft may be positioned to prevent a stall condition when the airspeed is below the minimum maneuver speed.

Figure 3:
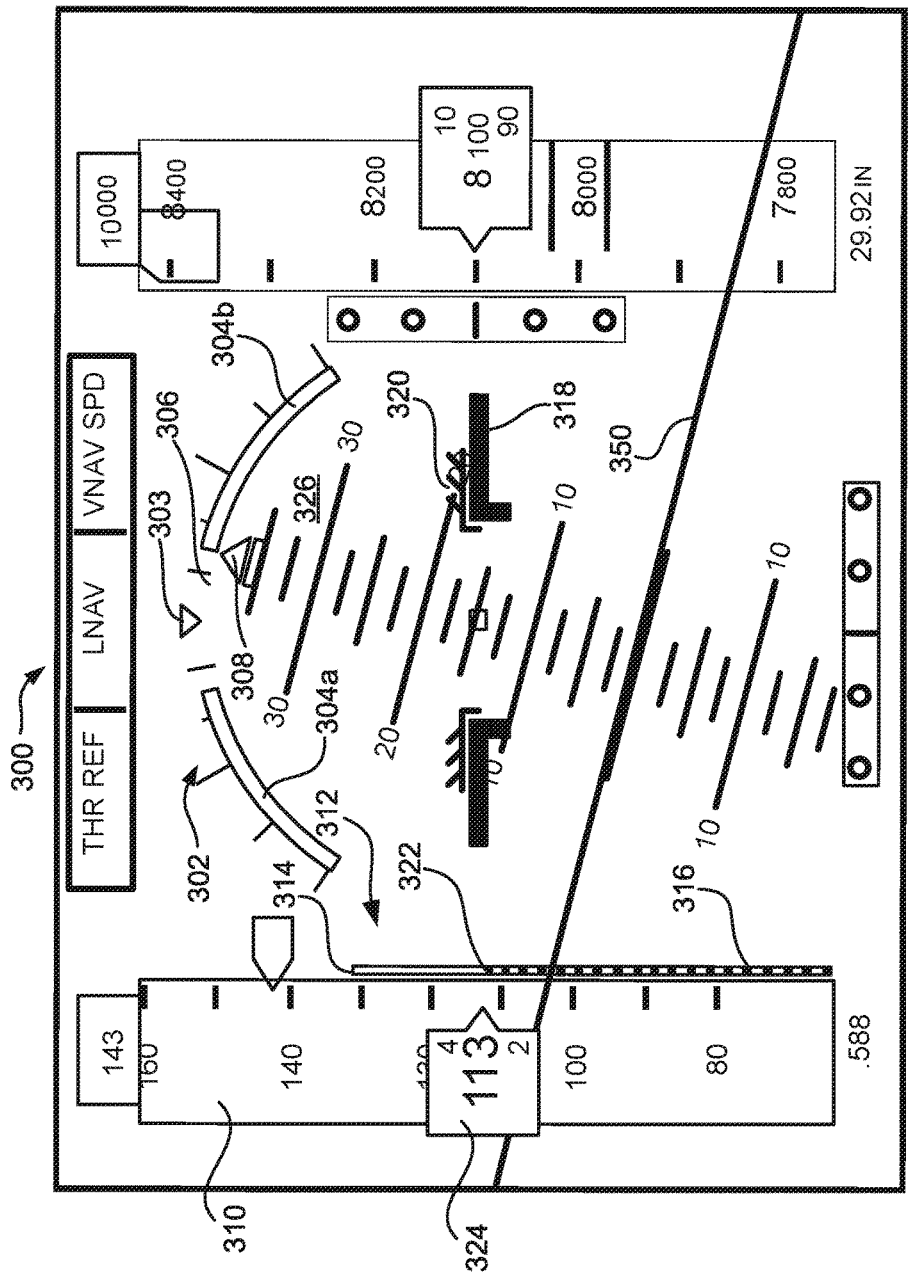
FIG. 3 is an example depiction of a flight display showing a bank limit indicator illustrating an example in which the aircraft is at the stick shaker speed.

Referring to FIG. 3, the current airspeed of the aircraft is indicated at the current airspeed indicator 324 as 113 knots, which is at the stick shaker speed 322. The stick shaker would be activated at this airspeed. The bank limit indicator 302 displays the safe bank angle section 306 to the lowest bank angle limit. That is, the bank limit indicator 302 shows the safe bank angle limit 306 as having the smallest section possible relative to the first unsafe bank angle limit section 304a and the second unsafe bank angle limit section 304b. As such, the first and second bank angle limit sections 304a,b extend through the majority of the range of the bank limit indicator 304.

Figure 4:
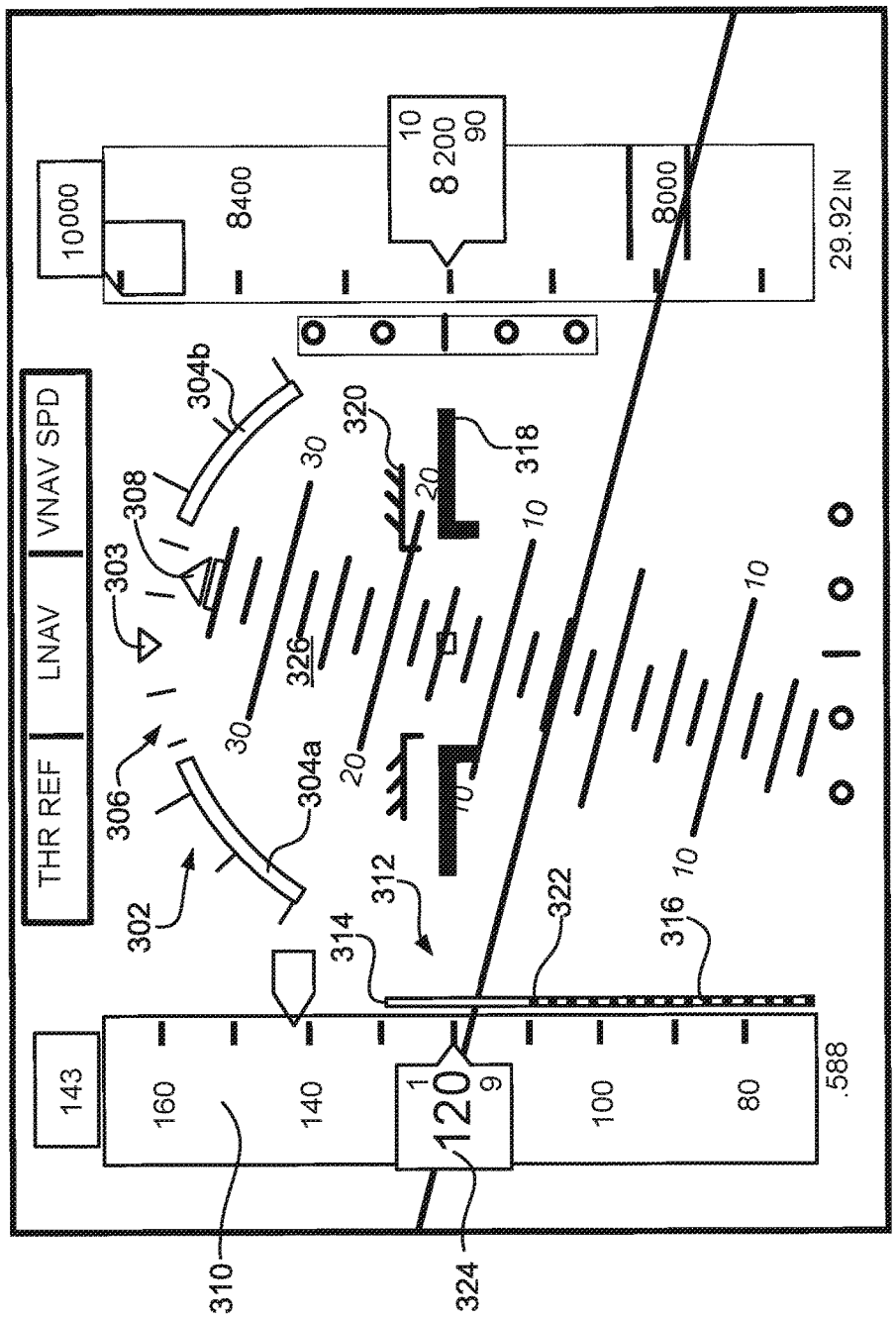
FIG. 4 is an example depiction of the flight display in FIG. 3 showing the bank limit indicator when the aircraft airspeed is above the stick shaker speed and less than the minimum maneuver speed.

As the aircraft flies at the stick shaker speed, the stick shaker is activated and the pilot is motivated to increase the airspeed. The pilot may do so by increasing the thrust of the aircraft. FIG. 4 is an example depiction of the flight display in FIG. 3 showing the bank limit indicator 302 when the aircraft airspeed is above the stick shaker speed 322 and less than the minimum maneuver speed 314. The aircraft airspeed is increasing from that shown in FIG. 3. The current airspeed indicator 324 indicates an airspeed of 120 knots, placing the airspeed in roughly the center portion of the maneuver margin region 312. The bank limit indicator 302 also shows the extent of the safe bank angle section 306 is larger than it was in FIG. 3 indicating the extent to which the bank angle limit has increased with increased airspeed. It is noted that the pitch limit indicator 320 also points to a higher pitch angle on the pitch scale 326 indicating the aircraft may increase its angle of attack at the higher speed.

Figure 5:
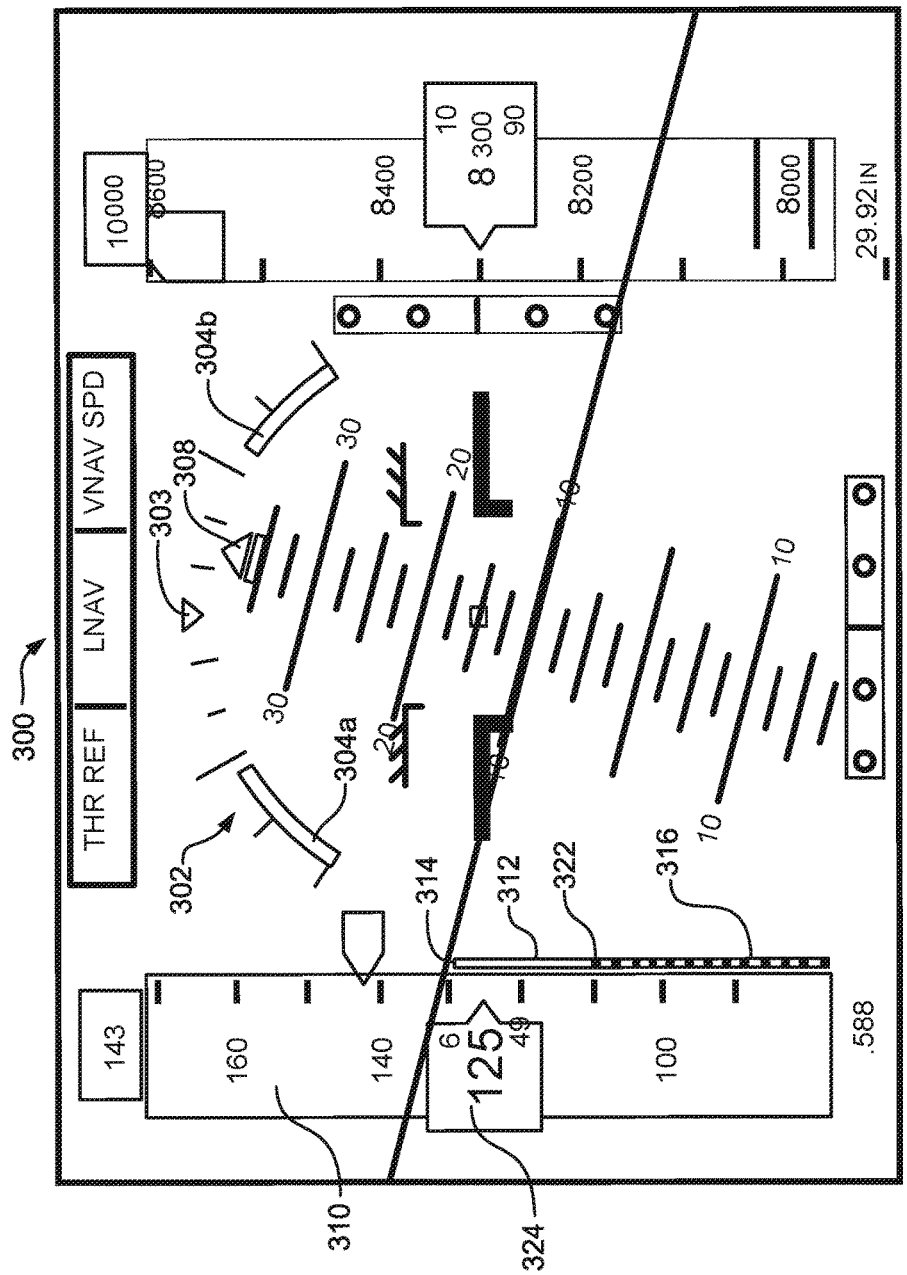
FIG. 5 is an example depiction of the flight display in FIG. 4 showing the bank limit indicator when the aircraft airspeed is above the speed of the aircraft indicated in the example illustrated in FIG. 4.

FIG. 5 is an example depiction of the flight display 300 in FIG. 3 showing the bank limit indicator 302 when the aircraft airspeed is above the speed of the aircraft indicated in the example illustrated in FIG. 4. The aircraft airspeed is increasing from that shown in FIG. 4 (about 120 knots). The current airspeed indicator 324 in FIG. 5 indicates an airspeed of 125 knots, placing the airspeed at roughly ⅓ from the top of the maneuver margin region 312. The bank limit indicator 302 also shows the extent of the safe bank angle section 306 is larger than it was in FIG. 4 indicating the extent to which the bank angle limit has increased with increased airspeed.

Figure 6:
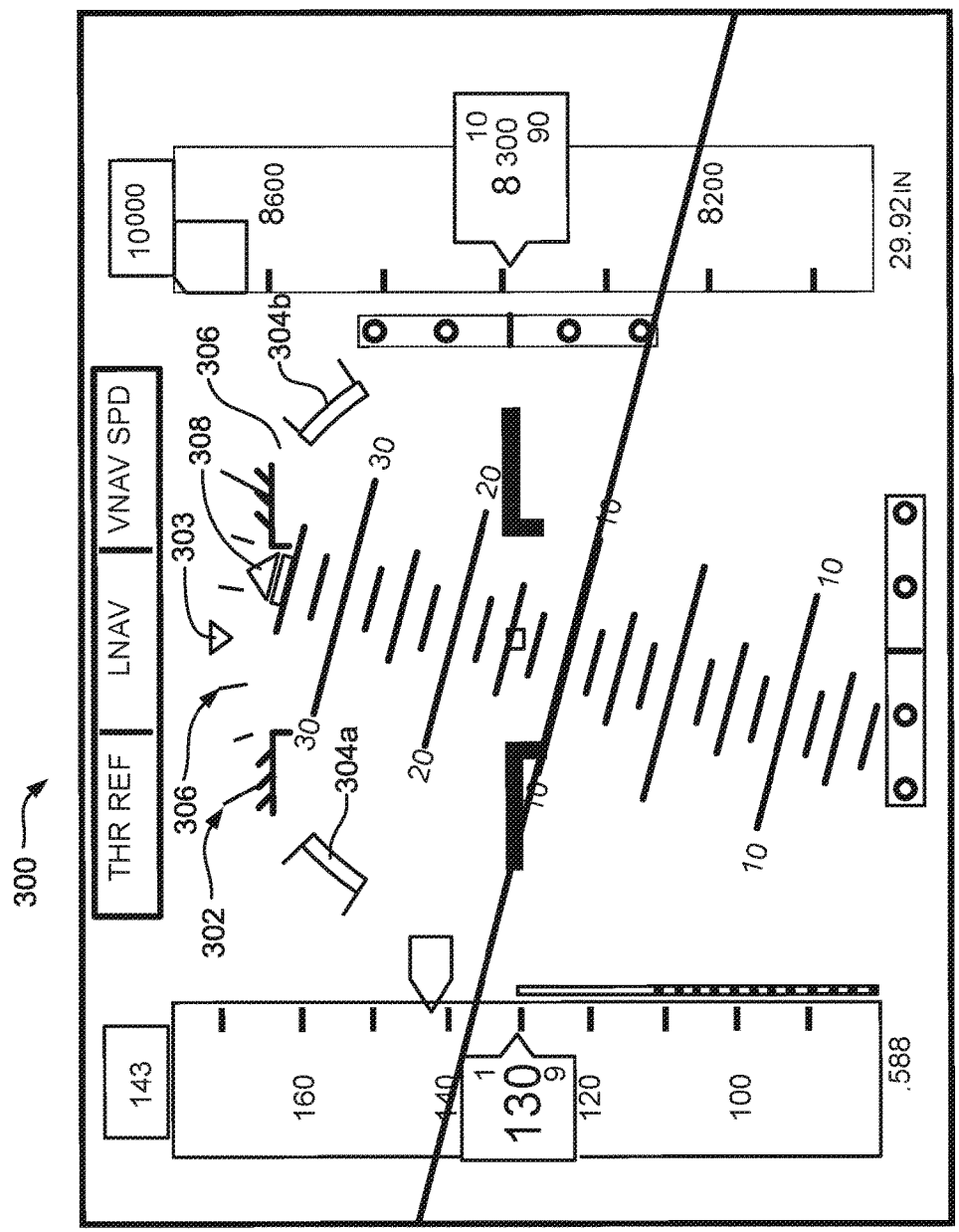
FIG. 6 is an example depiction of the flight display in FIG. 5 showing the bank limit indicator when the aircraft airspeed is approaching the minimum maneuver speed.

FIG. 6 is an example depiction of the flight display 300 in FIG. 5 showing the bank limit indicator when the aircraft airspeed is approaching the minimum maneuver speed. The aircraft airspeed is increasing from that shown in FIG. 5 (about 125 knots). The current airspeed indicator 324 in FIG. 6 indicates an airspeed of 130 knots, placing the airspeed at close to the top of the maneuver margin region 312. The bank limit indicator 302 also shows the extent of the safe bank angle section 306 is larger than it was in FIG. 5 indicating the extent to which the bank angle limit has increased with the increased airspeed.

Figure 7:
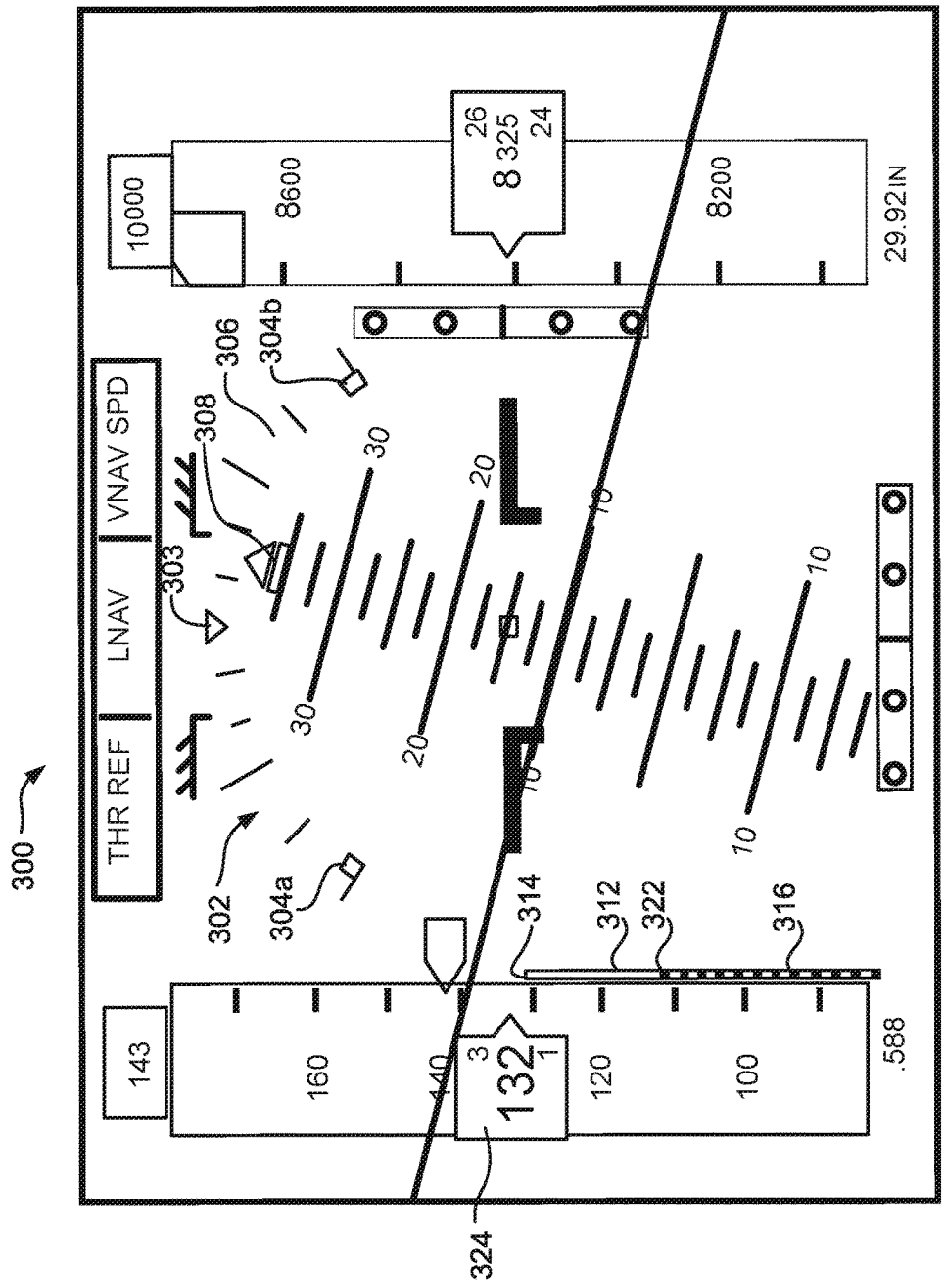
FIG. 7 is an example depiction of the flight display in FIG. 6 showing the bank limit indicator when the aircraft airspeed is at about the minimum maneuver speed.

FIG. 7 is an example depiction of the flight display 300 in FIG. 6 showing the bank limit indicator 302 when the aircraft airspeed is at about the minimum maneuver speed 314. The aircraft airspeed is increasing from that shown in FIG. 5 (about 130 knots). The current airspeed indicator 324 in FIG. 7 indicates an airspeed of 132 knots, placing the airspeed at the top of the maneuver margin region 312. The bank limit indicator 302 shows the extent of the safe bank angle section 306 is larger than it was in FIG. 6 encompassing almost the entire range of the bank angles. The unsafe bank angle limit sections 304a, 304b extend through a very small part of the bank limit indicator 302.

Figure 8:
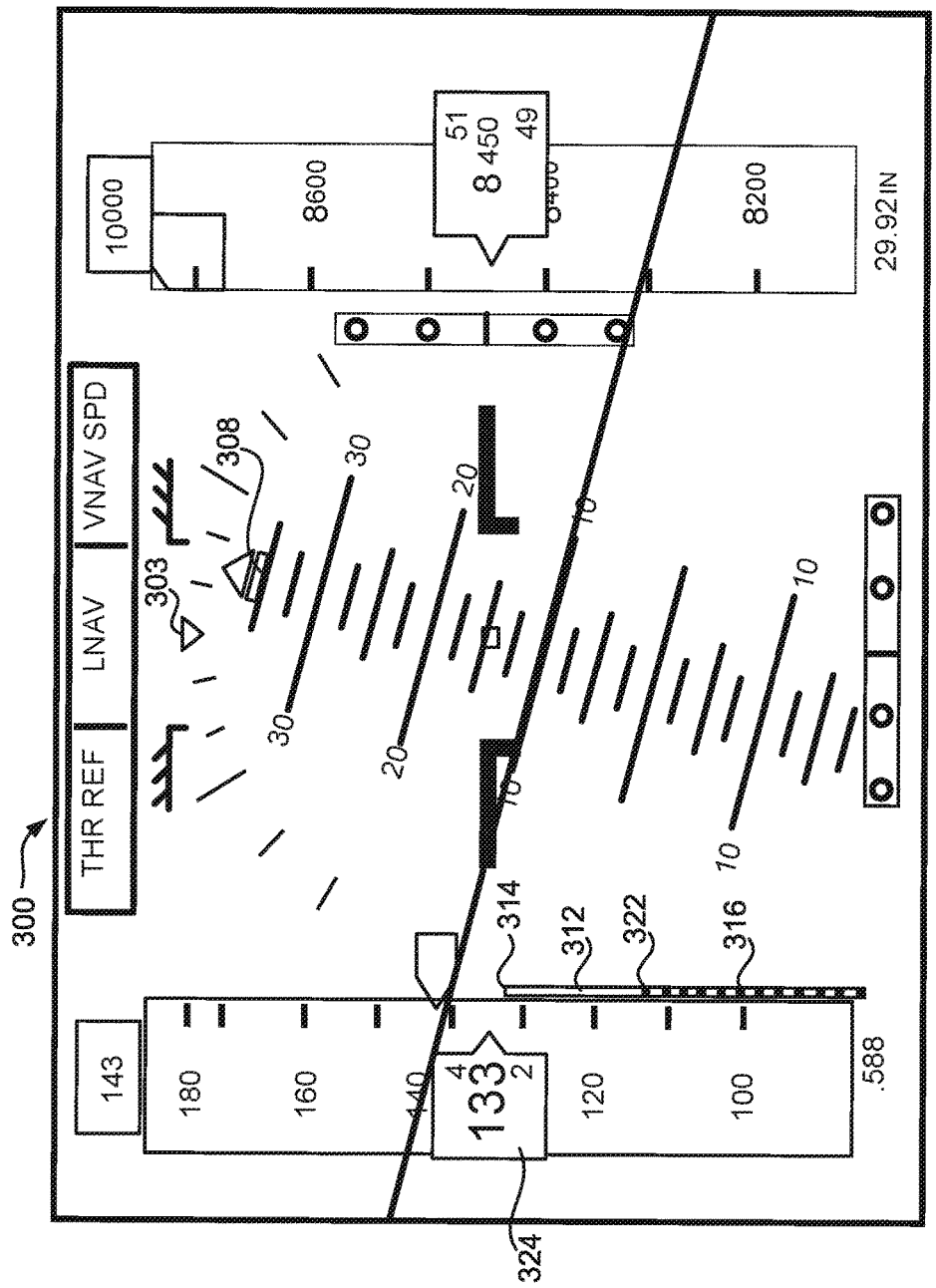
FIG. 8 is an example depiction of the flight display in FIG. 6 showing the bank limit indicator when the aircraft airspeed is above the minimum maneuver speed.

FIG. 8 is an example depiction of the flight display 300 in FIG. 7 showing the bank limit indicator 302 when the aircraft airspeed is above the minimum maneuver speed 314. As shown on the flight display 300 in FIG. 8, the bank limit indicator 302 is no longer displayed, which indicates no limitation on bank maneuvers by the aircraft when the airspeed of the aircraft exceeds the minimum maneuver speed.

Examples of systems and methods for providing a bank limit indicator on an aircraft display when the aircraft reaches speeds at or less than the minimum maneuver speed are described above with reference to FIGS. 1-8. Examples of the flight display with the bank limit indicator are described with reference to FIGS. 3-8 in particular. It is to be understood that the details of the graphical elements provided on the displays in FIGS. 3-8 may be changed. Graphical elements conveying the bank limit, pitch limit, airspeeds, and other information may be changed in shape, position on the screen, font, and content. In some examples, color is used to enhance the information conveyed on the display.

It will be understood that various aspects or details of the disclosure may be changed without departing from the scope of the disclosure. The above description is not exhaustive and does not limit the claims to the precise form disclosed herein. Furthermore, the above description is for the purpose of illustration only, and not for the purpose of limitation. Modifications and variations are possible in light of the above description or may be acquired from practicing the example implementations disclosed. The claims and their equivalents define the scope of the disclosure.

What is claimed is:

1. A method for indicating a bank limit on an instrument display in an aircraft, the method comprising:
   receiving a static air pressure measurement from a static air pressure sensor;
   receiving an impact air pressure measurement from a pitot air pressure sensor;
   receiving an acceleration measurement from an accelerometer;
   receiving an angle of attack measurement from an angle of attack sensor;
   determining a current airspeed based on the impact air pressure measurement and the static air pressure measurement;
   determining a stick shaker speed based on the current airspeed, wherein the stick shaker speed is a speed at which a pilot is warned of an imminent stall of the aircraft and the stick shaker is a method of providing a warning of the imminent stall;
   determining a minimum maneuver speed based on the current airspeed, the acceleration measurement and the stick shaker speed, wherein the minimum maneuver speed is a minimum airspeed that provides full maneuvering capability to the aircraft;
   displaying a bank limit indicator on a flight display when the current airspeed is equal to or less than the minimum maneuver speed; and
   displaying a bank angle limit on the bank limit indicator based on an extent to which the current airspeed is equal to or less than the minimum maneuver speed.

2. The method of claim 1 where the step of displaying the bank angle limit further includes:
   determining the bank angle limit for display on the bank limit indicator to a maximum bank angle limit when the current airspeed is equal to the minimum maneuver speed, to a minimum bank angle limit when the current airspeed is equal to the stick shaker speed, and to a bank angle between the maximum bank angle limit and the minimum bank angle limit when the current airspeed is between the minimum maneuver speed and the stick shaker speed.

3. The method of claim 2 where the step of determining the bank angle limit includes:
   selecting a bank angle value between the maximum bank angle limit and the minimum bank angle limit corresponding to the current airspeed where bank angle values between the maximum bank angle limit and the minimum bank angle limit correspond linearly with airspeed values between the minimum maneuver speed and the stick shaker speed.

4. The method of claim 1 further including:
   displaying the current airspeed by positioning a pointing graphic element on the flight display to point to the current airspeed on a band of airspeeds displayed on the flight display.

5. The method of claim 4 further including:
   indicating the stick shaker speed using a highlighting graphical element on the band of airspeeds displayed on the flight display.

6. The method of claim 4 further including:
indicating the minimum maneuver speed using a highlighting graphical element on the band of airspeeds displayed on the flight display.

7. The method of claim 1 where the step of displaying the bank limit indicator includes:
providing the flight display with data to indicate an arcuate band corresponding to a range of bank angles, the arcuate band including a first region indicating a range of safe bank angles between a zero bank position and the bank limit angle and a second region indicating a range of unsafe bank angles.

8. The method of claim 7 further including:
displaying a zero bank reference using a second pointing graphic element fixed on the flight display to the zero bank position on the arcuate band.

9. The method of claim 7 further including:
displaying a current bank angle pointer using a third pointing graphic element that moves along an arcuate path to point to a current bank angle on the range of bank angles as the bank angle of the aircraft changes.

10. The method of claim 9 where the third pointing graphic element is positioned at an upper end of a pitch scale indicating pitch angles, the method further including:
displaying a current pitch indicator marking a current pitch angle of the aircraft on the pitch scale.

11. The method of claim 10 further including:
determining a pitch limit angle based on a pitch margin to stick shaker; and
displaying a pitch limit indicator at the pitch limit angle on the pitch scale.

12. An aircraft control system for controlling an aircraft comprising:
an air data system including input connections to:
an angle of attack sensor to receive an angle of attack measurement;
a static air pressure sensor to receive a static air pressure measurement;
an accelerometer to receive an acceleration measurement; and
a pitot air pressure sensor to receive an impact air pressure measurement;
a flight display connected to receive flight data relating to the aircraft and to display the flight data; and
a flight control system including a processor and a non-transitory storage medium for storing machine-executable instructions that when executed by the processor perform:
a current airspeed function configured to determine a current airspeed based on the impact air pressure measurement and the static air pressure measurement;
a stick shaker speed function configured to determine a stick shaker speed based on the current airspeed, wherein the stick shaker speed is a speed at which a pilot is warned of an imminent stall of the aircraft and the stick shaker is a method of providing a warning of the imminent stall;
a minimum maneuver speed function configured to determine a minimum maneuver speed based on the current airspeed, the acceleration measurement and the shaker stick speed, wherein the minimum maneuver speed is a minimum airspeed that provides full maneuvering capability to the aircraft; and
a bank limit indicator function configured to generate a bank limit indicator for display on the flight display when the current airspeed is equal to or less than the minimum maneuver speed and to send the bank limit indicator to the flight display where the bank limit indicator displays a bank angle limit based on an extent to which the current airspeed is equal to or less than the minimum maneuver speed.

13. The aircraft control system of claim 12 where the bank limit indicator function is further configured to set the bank angle limit on the bank limit indicator to a maximum bank angle limit when the current airspeed is equal to the minimum maneuver speed, to a minimum bank angle limit when the current airspeed is equal to the stick shaker speed, and to a bank angle between the maximum bank angle limit and the minimum bank angle limit when the current airspeed is between the minimum maneuver speed and the stick shaker speed.

14. The aircraft control system of claim 13 where the bank limit indicator function is further configured to select a bank angle value between the maximum bank angle limit and the minimum bank angle limit corresponding to the current airspeed where bank angle values between the maximum bank angle limit and the minimum bank angle limit correspond linearly with airspeed values between the minimum maneuver speed and the stick shaker speed.

15. The aircraft control system of claim 12 where the non-transitory storage medium further includes machine-executable instructions that when executed by the processor are operable to:
display the current airspeed by positioning a pointing graphic element on the flight display to point to the current airspeed on a band of airspeeds displayed on the flight display.

16. The aircraft control system of claim 15 where the non-transitory storage medium further includes machine-executable instructions that when executed by the processor are operable to:
indicate the stick shaker speed using a highlighting graphical element on the band of airspeeds displayed on the flight display.

17. The aircraft control system of claim 15 where the non-transitory storage medium further includes machine-executable instructions that when executed by the processor are operable to:
indicate the minimum maneuver speed using a highlighting graphical element on the band of airspeeds displayed on the flight display.

18. The aircraft control system of claim 12 where the bank limit indicator function is further configured to:
providing the flight display with data to indicate an arcuate band corresponding to a range of bank angles, the arcuate band including a first region indicating a range of safe bank angles between a zero bank position and the bank limit angle and a range of unsafe bank angles.

19. The aircraft control system of claim 18 where the bank limit indicator function is further configured to:
display a zero bank reference using a second pointing graphic element fixed on the flight display to the zero bank position on the arcuate band.

20. The aircraft control system of claim 18 where the bank limit indicator function is further configured to:
display a current bank angle pointer using a third pointing graphic element that moves along an arcuate path to point to a current bank angle on the range of bank angles as the current bank angle of the aircraft changes.

* * * * *